United States Patent [19]

Dombrowski et al.

[11] Patent Number: 4,711,633
[45] Date of Patent: Dec. 8, 1987

[54] INSTRUCTIONAL DEVICE FOR TENNIS PLAYERS

[75] Inventors: Michael A. Dombrowski, 1330 5th Ave., NE., 187 Tara Woods, Hickory, N.C. 28603; Nancy M. Eikeland, Brevard, N.C.

[73] Assignee: Michael A. Dombrowski, Hickory, N.C.

[21] Appl. No.: 846,006

[22] Filed: Mar. 31, 1986

[51] Int. Cl.⁴ .............................................. G09B 1/22
[52] U.S. Cl. .................................... 434/247; 434/404
[58] Field of Search ................ 434/247, 252, 404, 405

[56] References Cited

U.S. PATENT DOCUMENTS 3,249,085 5/1966 St. Jean ........................... 434/404 X Primary Examiner—William H. Grieb
Attorney, Agent, or Firm—Charles Hieken

[57] ABSTRACT

An instructional device is provided for tennis players to identify their stroke problems and to analyze the cause of those stroke problems. In addition, the instructional device of the present invention includes a grip analysis section to help tennis players identify and correct their grip problems.

10 Claims, 5 Drawing Figures

INSTRUCTIONAL DEVICE FOR TENNIS PLAYERS

FIELD OF INVENTION

This invention relates to calculators and more particularly to wheel type calculators designed to help tennis players identify and correct their stroke problems.

BACKGROUND OF INVENTION

The game of tennis is one of increasing popularity in this country as well as in foreign countries. For the serious minded player who desires to improve his game, some form of instruction is needed to identify and correct that player's stroke problems. Preferably, the serious player should seek formal tennis instruction from a qualified tennis instructor. Even formal tennis instruction needs supplementing. Additionally, such instruction is relatively expensive and is a luxury which most players cannot afford on a contingency basis.

In lieu of actual formal instruction, many players turn to the so called "How To" books relating to the game of tennis. These "How To" books are relatively inexpensive and can be afforded by most players. However, the person who reads such an instructional book while sitting in his chair at home ofter does not carry that knowledge with him onto the tennis court. Accordingly, an instructional device is needed which is relatively inexpensive and which can be carried courtside for use during play.

BRIEF DESCRIPTION OF INVENTION

After much research and study into the above-mentioned problems, the present invention has been developed to provide a relatively inexpensive means for identifying and correcting stroke problems. This is accomplished through the use of a rotatable calculator which indicates not only the player's stroke problems, but also the various causes of those problems. In addition, the calculator indicates to the user the proper grips for the various tennis strokes. The calculator is designed for courtside use where instruction will be most effective.

In view of the above, it is an object of the present invention to provide an instructional device for identifying a tennis player's stroke problems.

Another object of the present invention is to provide an instructional device which indicates the cause or causes of a previously identified stroke problem.

Another object of the present invention is to provide an instructional device which indicates the proper grips for the various tennis strokes.

Another object of the present invention is to provide an instructional device which may be carried courtside for use during play.

Another object of the present invention is to provide an instructional device which will be relatively inexpensive to purchase.

Another object of the present invention is to provide an instructional device which is simple in structure and easy to manufacture.

Other objects and advantages of the present invention will become apparent and obvious from study of the following description and the accompanying drawings which are merely illustrative of such invention.

DETAILED DESCRIPTION OF INVENTION

Figure 1:
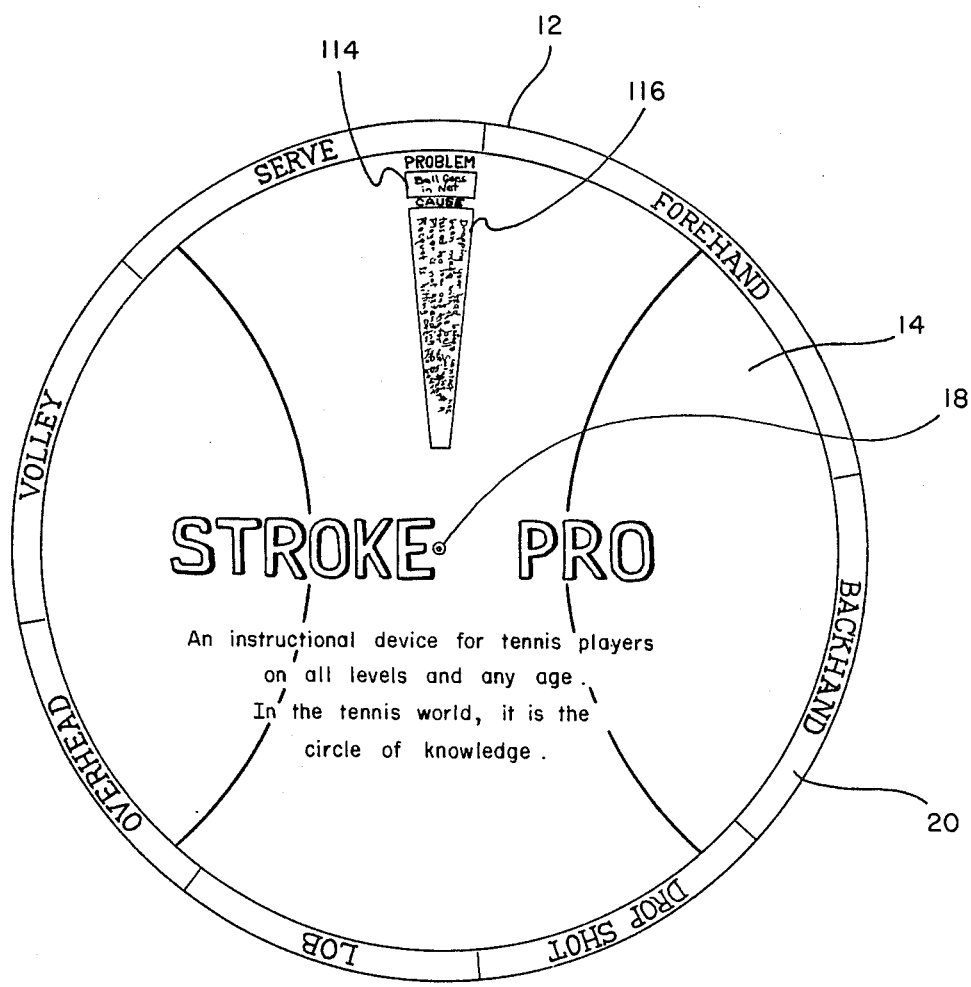
FIG. 1 is a plan view of side one of the instructional calculator of the present invention showing both the main disk and the outer disk.
Figure 2:
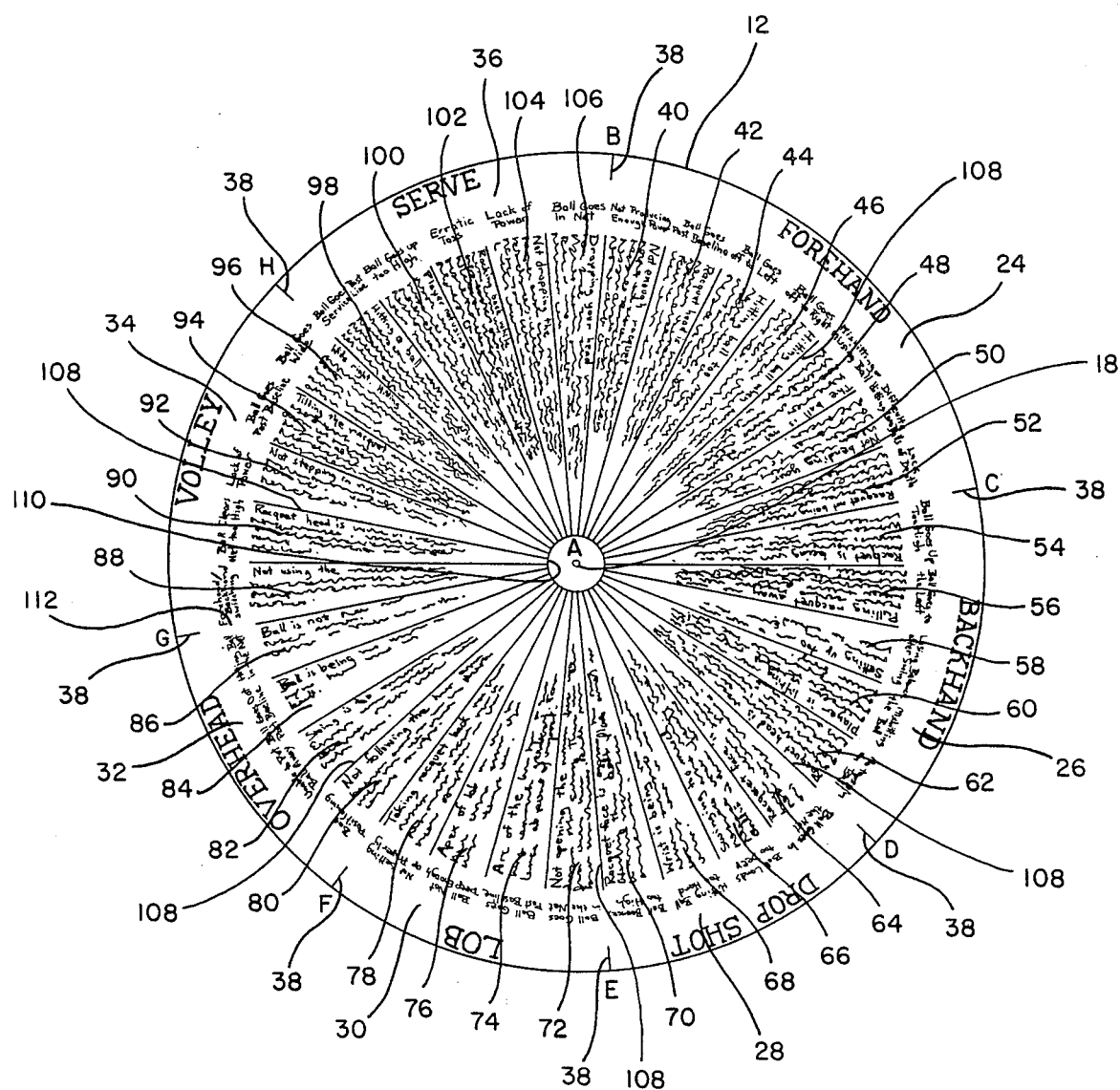
FIG. 2 is a plan view of side one of the instructional calculator of the present invention showing the main disk only.

With further reference to the drawings, the instructional device of the present invention is indicated generally at 10 and is in the form of a rotatable calculator. Such calculator has two sides, side one illustrated in FIGS. 1 and 2 is a cause analysis calculator which enables a player to determine the cause or causes of his or her stroke problems. Side two includes a grip analysis calculator as well as a match analysis chart which enables a player to identify his or her stroke problems Viewing the instructional device 10 in more detail, it is seen that the same includes two smaller outer disks 14 and 16 rotatively secured to opposite sides of a larger main disk 12 by a rivet or similar means 18. This means 18 extends through the respective centers of each disk so that the disks are concentric with respect to each other. Because the diameter of the outer disks 14 and 16 are slightly smaller than the main disk 12, there is formed an outer peripheral rim portion 20 and 22 on side one and two respectfully of main disk 12 which is not covered by the outer disks 14 and 16.

Referring more specifically to FIG. 2, side one 14' of main disk 12 is shown therein and includes a number of reference points. Point A refers to the center of main disk 12. Points B through H refer to points on the circumference of main disk 12. This side of main disk 12 is divided into seven larger sectors which are indicated individually by even numbers 24 through 36 and are separated by lines 38 extending radially inwardly from points B through H on the circumference on such main disk 12. Larger sector 24 is defined by the imaginary lines AB and AC and by the arc BC. Larger sector 26 is defined by the imaginary lines AC and AD and by the arc CD. Sectors 28, 30, 32, 34, and 36 are similarly defined The larger sectors 24 through 38 are divided into smaller sectors indicated individually by even numbers 40 through 106 by lines 108 extending radially outwardly from a central ring 110. Each line 108 terminates substantially short of the outer peripheral rim portion 20 of main disk 12 so as to define a ring like area 112 between outer rim portion and the smaller sectors 40 through 106.

A particular tennis stroke is identified with each sector by printing the stroke name in the outer rim portion 20 of each larger sector 24 through 38. For instance, the word "FOREHAND" is printed in the outer rim portion 20 of sector 24. The word "BACKHAND" is printed in the outer rim portion 20 of sector 26. The words "DROP SHOT", "LOB", "OVERHEAD", "VOLLEY", and "SERVE" are printed, respectively, on the outer rim portion 20 of sectors 28, 30, 32, 34, and 36.

A plurality of stroke problems associated with each stroke are printed in the ring like area above each smaller sector 40 through 106. For instance, the words "not producing enough power" are printed in the ring like area 112 above sector 40. The cause or causes of that stroke problem is then printed within the corresponding sector 40. More particularly sector 40 lists a number of causes which would result in insufficient power in the forehand grip as follows:

"Not enough racquet speed through the shot. Improper weight and body movement into the shot. Not stepping to the ball. Follow through is to short."

It is appreciated that for each smaller sector 40 through 106 there is printed in the ring like area 112 above that sector a stroke problem and the causes of that stroke problem are printed within such sector. The stroke problems and causes for sectors 42 through 106 are as follows:

Sector 42
Stroke Problem: Ball goes past baseline
Cause: Racquet head is tilted up while making contact with ball. Ball is being hit late and player is hitting off his back foot. Player is lifting his head and body while swinging.

Sector 44
Stroke Problem: Ball goes off to left
Cause: Hitting too far out in front of your body. Swinging racquet across your body. Not following through in direction of your target.

Sector 46
Stroke Problem: Ball goes off to right.
Cause: Hitting ball when it is too close to your body. Pulling your body and racquet away from the ball while hitting. Players wrist is leading the racquet head through the swing.

Sector 48
Stroke Problem: Mishitting or missing ball
Cause: The ball is not being watched close enough prior to contact. Player is either too close or too far away from the ball. Gripping racquet too loose.

Sector 50
Stroke Problem: Difficulty hitting low balls
Cause: Not bending your knees and failing to drop your racquet down to the level of the ball. Racquet is positioned too high during backswing. Slow moving to the ball.

Sector 52
Stroke Problem: Lack of depth
Cause: Racquet not being taken far enough back when preparing to hit ball. Swing is not traveling from low to high. Too close to ball. Follow through is too short. Racquet head rolling over ball too much causing excess topspin.

Sector 54
Stroke Problem: Ball goes up too high
Cause: Racquet is being taken back in a horizontal position during the backswing instead of being kept parallel to net. Racquet head not being kept parallel to net throughout the stroke. Player's weight is on his back foot during the stroke.

Sector 56
Stroke Problem: Ball goes to the left
Cause: Pulling racquet away from ball during the stroke. Player turning shoulders to face net before ball has been hit. Ball being hit late. Contact is being made with right side of ball. Wrist is leading racquet through the swing.

Sector 58
Stroke Problem: Losing balance after swing
Cause: Setting up too close or too far away from the ball. Swinging at the ball too hard.

Sector 60
Stroke Problem: Mishitting the ball
Cause: Player is lifting his head and body up during the swing. Looking at your target rather than at the ball. Wrist is being turned at the point of contact. Loose grip.

Sector 62
Stroke Problem: No topspin on ball
Cause: Racquet head is being taken back above your wrist in the backswing position. Tilting the racquet face up while stroking the ball. Not keeping the racquet head parallel to the net while swinging in a low to high motion.

Sector 64
Stroke Problem: Ball goes in the net
Cause: Racquet face is tilted down while swinging. Hitting too soft. Not watching the ball. Wrist is too loose during swing.

Sector 66
Stroke Problem: Ball lands too deep
Cause: Swinging too much. Too close to the ball. Racquet is being taken back too far and follow through is too long. Ball is being hit too flat.

Sector 68
Stroke Problem: Hitting ball too hard
Cause: Wrist is being kept too firm and not flexible enough to take the pace off the shot.

Sector 70
Stroke Problem: Ball bounces too high
Cause: Racquet face is opened too much. Hitting the ball flat and not with underspin. Using too much arm and too little wrist while hitting the ball.

Sector 72
Stroke Problem: Ball goes in the net.
Cause: Not opening the racquet face up during the swing. Turning the racquet face over the ball during the swing. Falling back while hitting.

Sector 74
Stroke Problem: Ball goes past baseline
Cause: Arc of the lob is not high enough vertically. Too tense at point of impact.

Sector 76
Stroke Problem: Ball not deep enough
Cause: Apex of lob is too low. Not keeping racquet face open during follow through.

Sector 78
Stroke Problem: Not setting up properly
Cause: Taking racquet back too late. Taking too much backswing. Not scrambling into position quick enough.

Sector 80
Stroke Problem: Bad positioning
Cause: Not following the ball while it is in the air. Hitting the ball when it is off too far to the right or left.

Sector 82
Stroke Problem: Unable to put ball away
Cause: Swing is too tentative. Contact is not being made out in front. Not turning sideways to hit the ball.

Sector 84
Stroke Problem: Ball goes out past baseline.

Cause: Ball is being hit behind you and/or hitting under the ball.

Sector 86

Stroke Problem: Hitting ball in the net

Cause: Ball is not being met high enough. Letting the ball drop too low.

Sector 88

Stroke Problem: Forehand/Backhand switching.

Cause: Not using the continental grip to hit both volleys. Slow getting back to the ready position after each point.

Sector 90

Stroke Problem: Ball clears net too high

Cause: Racquet head is slicing underneath ball. Laying wrist back while volleying. Dropping the racquet head below your wrist.

Sector 92

Stroke Problem: Lack of power

Cause: Not stepping in toward ball. Wrist not being kept firm. Contact is not being made out in front of your body.

Sector 94

Stroke Problem: Ball goes past baseline

Cause: Tilting the racquet face up and hitting tco much under the ball. Hitting the ball late. Swinging too much. Too much backswing and follow through.

Sector 96

Stroke Problem: Ball goes wide

Cause: Wide right: Hitting the left side of the ball too much. Turning your hand too much to the right. Moving sideways and not forward Wide left: Hitting the right side of the ball too much. Turning hand too much to the left.

Sector 98

Stroke Problem: Ball goes past service line

Cause: Hitting a ball tossed behind your head. Contact is made with the bottom of the ball. Racquet face is tilted up during contact with ball. Not turning the racquet face from left to right while ball is being hit.

Sector 100

Stroke Problem: Ball goes up too high

Cause: Player not using continental grip. Ball toss is behind the player. Contact being made out in front and slightly to right of player.

Sector 102

Stroke Problem: Eratic toss

Cause: Rocking back while tossing the ball. Holding the ball incorrectly. Bending your tossing arm while extending up to release the ball. Holding on too long to the ball. Releasing the ball too soon.

Sector 104

Stroke Problem: Lack of power

Cause: Not dropping the racquet behind your back prior to extending up to hit the ball. Arm is in a bent position while hitting. Players body weight has been transferred past the ball before impact.

Sector 106

Stroke Problem: Ball goes in net

Cause: Dropping your head before contact has been made. Swinging at ball tossed too low and too far out in front. Player is not extending up to hit the ball. Racquet is hitting over the ball.

Referring now to FIG. 1 it is seen that outer disk 14 includes two sector shaped openings 114 and 116 which are labeled respectively "PROBLEM" and "CAUSE". Opening 116 aligns substantially with the smaller sectors 40 through 106 of the underlying main disk 112. It is appreciated therefore that the cause analysis information printed within each sector is clearly visible through opening 114 when the same is in the line with that sector. Opening 114 aligns with the ring like area 112 on the underlying main disk 12 such that the stroke problems printed within the ring like area 112 may be read through opening 116 when aligned therewith.

Figure 3:
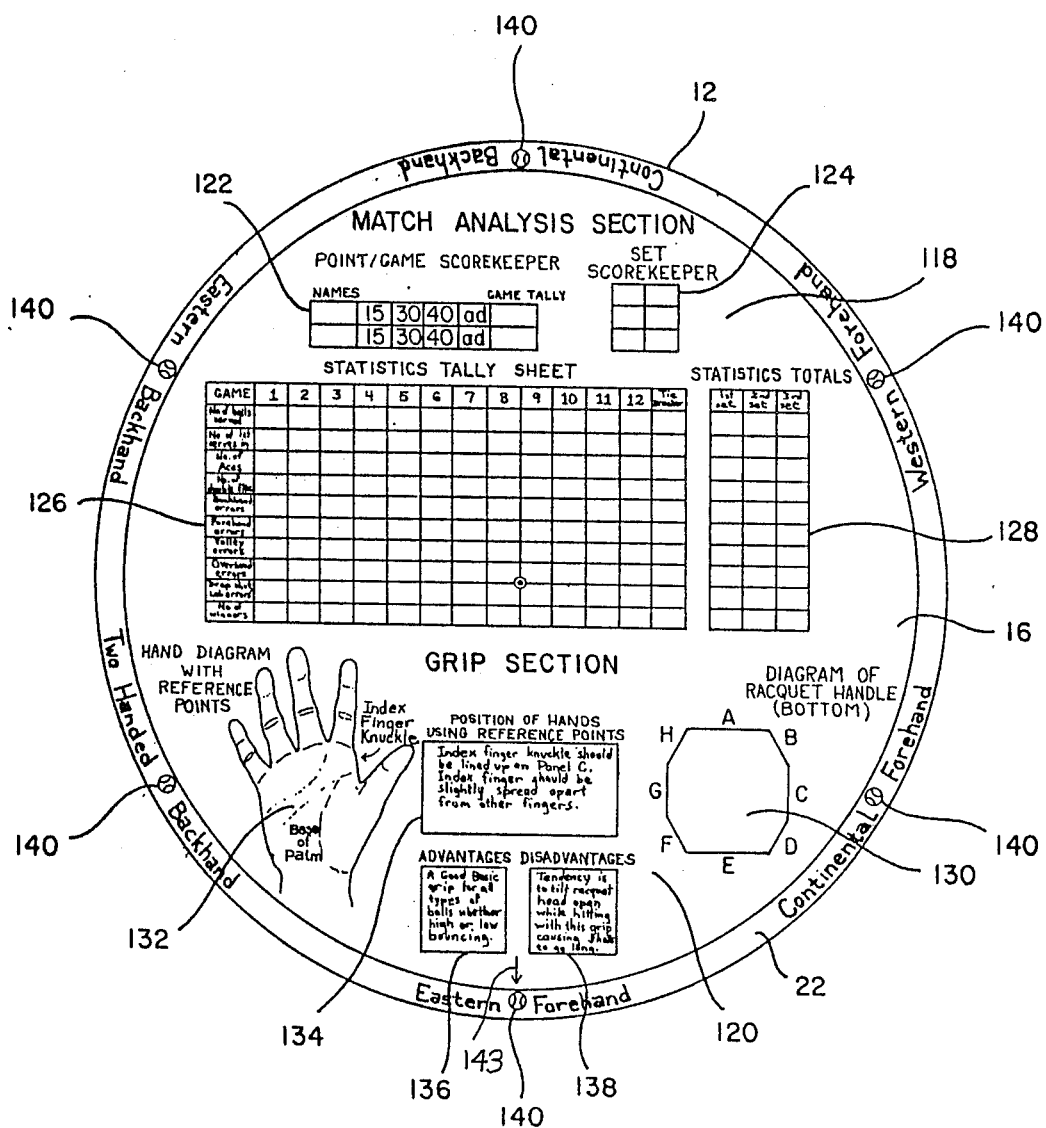
FIG. 3 is a plan view of side two of the instructional calculator of the present invention showing both the main disk and the outer disk.

Referring now to FIG. 3, it is seen that side two 16' of the instructional device 10 of the present invention is divided into essentially two sections; a match analysis section 118 in the upper portion of outer disk 16 and a grip section 120 in the lower portion of outer disk 16. The match analysis section 118 includes four charts. The point/game scorekeeper chart 122 comprises twelve individual squares arranged in six columns and two rows. The word "Names" is printed above column one. The words "Game Tally" are printed above the sixth column. The individual squares in columns one and six of the point/game scorekeeper chart 122 are left blank. The numeral "15" is printed within the individual squares in column two. The numerals "30" are printed within the individual squares in column three. The numerals "40" are printed within the individual squares in column four. Finally, the letters "ad" are printed in the individual squares in column five.

The set scorekeeper chart 124 comprises six individual squares arranged in two columns and three rows. Each of the individual squares in the set scorekeeper chart 124 is left blank.

The statistics tally sheet 126 comprises 154 individual squares arranged in fourteen columns and eleven rows. The word "GAME" is printed in the square in the upper left hand corner of statistics tally sheet 126. Within the remaining squares in row one of the statistics tally sheet 126 are printed, respectively, the numbers 1 through 12 and "Tie Breaker" as can be clearly seen in FIG. 3. Within the remaining squares in column one of statistics tally sheet 126 is printed respectively "No. of balls served", "No. of 1st Serves In", "No. of Aces", "No. of Double Faults", "Backhand Errors", "Forehand Errors", "Volley Errors", "Overhead Errors", "Drop Shot, Lob Errors" and "No. of Winners".

Finally, statistics total chart 128 comprises 33 individual squares arranged in three columns and eleven rows. The first square in each column are labeled respectively "1st Set", "2nd Set", and "3rd Set".

The grip section 120 includes a racquet handle diagram 130 depicting the bottom of a racquet handle and a hand diagram 132 with reference to the index finger knuckle and base of palm.

Between racquet handle diagram 130 and hand diagram 132 there are formed three rectangular windows 134, 136, and 138. The larger window 134 is labeled "POSITION OF HAND USING REFERENCE POINTS." The smaller windows 136 and 138 below the larger window 134 are labeled respectively "ADVANTAGES" and "DISADVANTAGES". The purpose of windows 134, 136, and 138 will hereinafter be described in greater detail below.

Six keys 140 in the form of a tennis ball are equally spaced along the outer rim portion 22 of side two of main disk 12. Six commonly used tennis grips are also printed on outer rim portion 22 adjacent respective keys 140 as follows: "Eastern Forehand", "Two Handed Backhand", "Eastern Backhand", "Continental Backhand", "Western Forehand", and "Continental Forehand".

Figure 4:
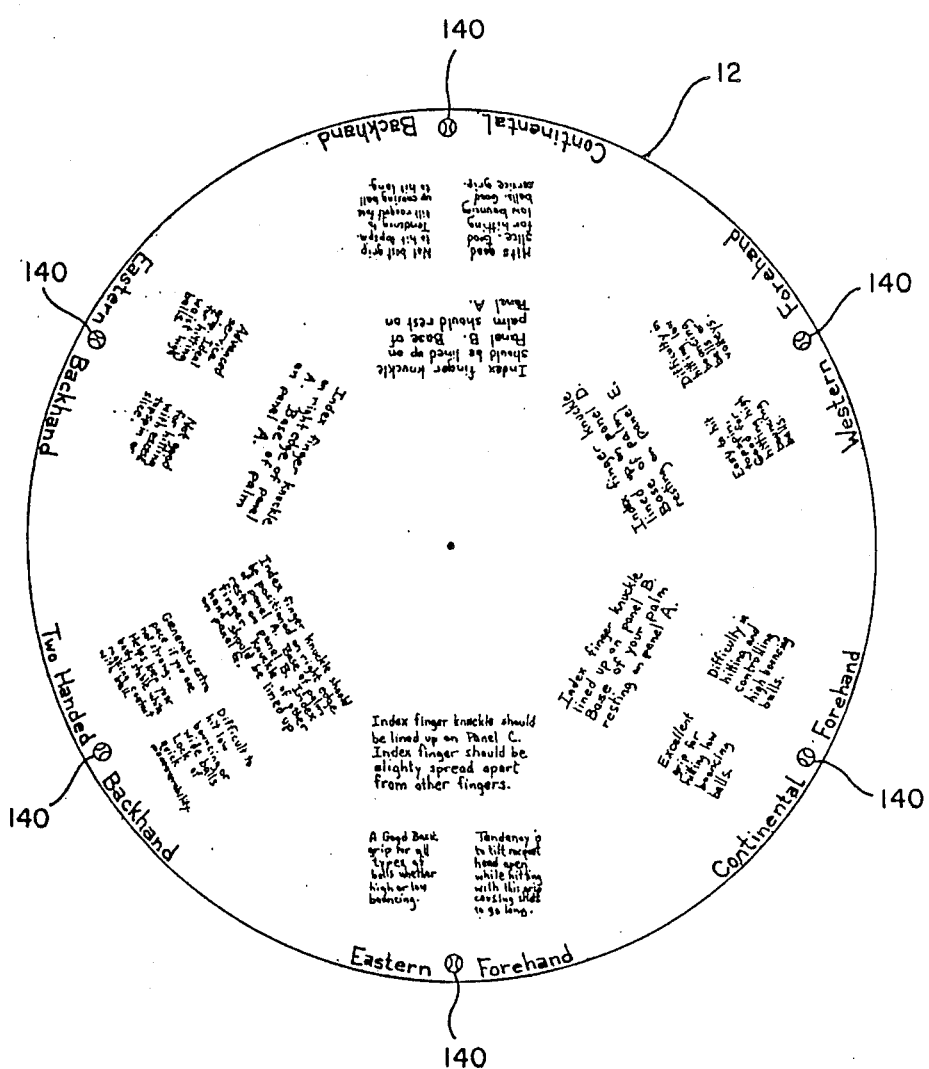
FIG. 4 is a plan view of side two of the instruc:tional calculator of the present invention showing the main disk only.
Figure 5:
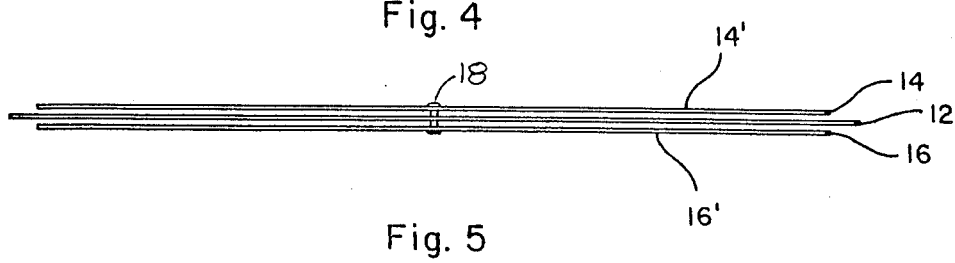
FIG. 5 is a side elevational view of such invention.

Also printed on side two of main disk 12 are descriptions for each tennis grip as well as the advantages and disadvantages of that grip as can be clearly seen in FIG. 4. It is appreciated that the description of each tennis grip is printed on main disk 12 so as to align with window 134 of the overlying outer disk 16. The advantages and disadvantages of each grip should align respectively with windows 136 and 138 of outer disk 16.

By aligning arrow 142 with a selected key 140, there will be displayed in window 134 a description of the corresponding tennis grip. For instance, arrow 142 in FIG. 3 is aligned with key 140 associated with the "Eastern Forehand". In window 134 a description of the Eastern forehand grip is displayed and reads as follows:

"Index finger knuckle should be lined up on panel C. Index finger should be slightly spread apart from other fingers."

The advantages of the Eastern forehand grip are displayed in window 136 and read as follows:

"A good basic grip for all types of balls whether high or low bouncing."

The disadvantages of the Eastern forehand grip are displayed through window 138 and read as follows:

"Tendency is to tilt racquet head open while hitting with this grip causing shots to go long."

The other five grips, and their advantages and disadvantages are set forth as follows:

Grip: Continental Forehand
Position of Hand: Index finger knuckle line up on panel B. Base of your palm resting on panel B.
Advantages: Excellent grip for hitting low bouncing balls.
Disadvantages: Difficulty in hitting and controlling high bouncing balls.

Grip: Western Forehand

Position of Hand: Index finger knuckle lined up on panel D. Base of palm resting on panel E.
Advantages: Easy to hit topspin. Good for hitting high bouncing balls.
Disadvantages: Difficulty in hitting low bouncing balls or volleys.

Grip: Continental Backhand
Position of Hand: Index finger knuckle line should be line up on panel B. Base of palm should rest on panel B.
Advantages: Hits good slice. Good for hitting low bouncing balls. Good service grip.
Disadvantages: Not best grip to hit topspin. Tendency to tilt racquet face up causing ball to be hit long.

Grip: Eastern Backhand
Position of Hand: Index finger knuckle on right edge of panel A. Base of palm on panel A.
Advantages: Advanced service grip. Ideal for hitting waist high balls.
Disadvantages: Not good for hitting with excess topspin or slice.

Grip: Two Handed Backhand
Position of Hand: Index finger knuckle should be positioned on right edge of panel A. Base of palm rests on panel A. Index finger knuckle of other hand should be lined up on panel G.
Advantages: Generates extra pace if you are not strong. Helps keep your body stable while making contact with the ball.
Disadvantages: Difficult to hit low bouncing or wide balls. Lack of quick maneuverability The instructional device 10 of the present invention has the advantage of providing simple, easy to use courtside instruction for the tennis player. For instance, should a stroke problem become apparent during the course of play, the tennis player can use such instructional device to determine the cause of that problem. This is accomplished by grasping the outer rim portion 20 of main disk 12 and rotating the outer disk 14 with respect thereto. The outer disk 14 is rotated until the player's particular stroke problem appears in window 116. When the appropriate stroke problem has been indicated in window 116, the player will find the cause analysis of that stroke problem in window 114.

In some instances, a player may not be aware of his or her particular stroke problems. These can be determined by using the match analysis section 118 of side two of the instructional device 10. To use the match analysis section 118 the player should have an observer flip to side two and when the match begins, the observer should chart the players statistics on the statistics tally sheet 126. For instance, each time the player serves a ball the observer should place a slash mark in the appropriate column on the row marked "No. of Balls Served". If the serve is an ace the observer places a slash mark in the appropriate column in the row marked "No. of Aces". The statistical data for each game should be made in the appropriate column.

At the end of a game, the observer should place a slash mark in the appropriate space on the point/game scorekeeper chart 122. At the end of each set, the observer should record the set score in the set scorekeeper chart 124. The observer should also add up the player's statistics and write the totals in the appropriate boxes on the statistics total chart 128. After the statistics have been analyzed, the tally sheet 126 can be erased in preparation for recording the data for the next set.

At the end of a match, the player should have sufficient statistical information to determine his or her particular stroke problems. Once those problems have been identified, the player can use side one of the instructional device 10 as described above to ascertain the cause or causes of those problems From the above it can be seen that by using the instructional device 10 of the present invention the player can identify his or her particular stroke problems. Having ascertained those stroke problems, the player may use the cause analysis side of the instructional device 10 to ascertain the possible cause or causes of that problem. If a problem becomes apparent during the course of play, the player may use the instructional device 10 between games to correct those problems. Thus, it is seen that the present invention has the advantage of providing inexpensive, simple and yet effective courtside instruction.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An instructional device for tennis players comprising: a base member; first indicia on said base member indicating a plurality of stroke problems related to plurality of different strokes; second indicia on said base member indicating the possible cause or causes of each said stroke problem; a second member movably secured to said base member and having a first window for alignment with said first indicia and a second window for alignment with said second indicia whereby when a player aligns said first window with a selected stroke problem indicia, corresponding cause indicia will be visible through said second window.

2. The instructional device of claim 1 wherein said base member and said second member are disks rotatively connected at their respective centers.

3. The instructional device of claim 2 wherein said base member disk has a diameter greater than said second disk such that a peripheral rim on said base member disk is visible.

4. The instructional device of claim 3 wherein said peripheral rim includes indicia identifying different tennis strokes.

5. An instructional device for tennis players comprising: a base member having a first side and a second side; first indicia on said first side indicating a plurality of stroke problems related to a plurality of different strokes; second indicia on said first side indicating the possible cause or causes of each said stroke problem; a second member movably secured to said first side of said base member; said second member having a first window for alignment with said first indicia and a second window for alignment with said second indicia whereby when a player aligns said first window with a selected stroke problem indicia, a corresponding cause indicia will be visible through said second window; first indicia on said second side of said base member indicating a plurality of different grips; second indicia on said second side of said base member describing each said grip; a third member movably secured to said second side of said base member, said third member having indicator means for alignment with said first indicia and window means for alignment with said second indicia whereby when a player aligns said indicator means with a selected grip indicia, a corresponding grip description indicia will be visible through said window means.

6. The instructional device of claim 5 wherein said base member, second member, and third member are disks rotatively connected at their respective centers.

7. The instructional device of claim 5 wherein said second and third members have a diameter less than said base member such that a peripheral rim is formed on said first and second sides of said base member.

8. The instructional device of claim 5 wherein said first indicia is disposed within said peripheral rim portion of said second side of said base member 9. The instructional device of claim 5 wherein one of said first and third members includes indicia defining a statistics tally sheet having a plurality of columns and a plurality of rows for recording vital game statistics during play.

10. The instructional device of claim 5 wherein one of said first and third members includes indicia defining a hand diagram and a racquet handle diagram.

* * * * *